United States Patent
White et al.

(10) Patent No.: US 11,768,505 B2
(45) Date of Patent: Sep. 26, 2023

(54) RIDE SYSTEM WITH DYNAMIC RIDE VEHICLE CONFIGURATIONS

(71) Applicant: Universal City Studios LLC, Universal City, CA (US)

(72) Inventors: Nathanael G. White, Orlando, FL (US); Kevin B. Primm, Orlando, FL (US); Daniel Freedman, Ocoee, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 1268 days.

(21) Appl. No.: 16/269,946

(22) Filed: Feb. 7, 2019

(65) Prior Publication Data
US 2020/0257309 A1    Aug. 13, 2020

(51) Int. Cl.
*B60D 1/01*    (2006.01)
*G05D 1/02*    (2020.01)
(Continued)

(52) U.S. Cl.
CPC .......... *G05D 1/0287* (2013.01); *A63G 31/00* (2013.01); *B60D 1/01* (2013.01); *A63G 25/00* (2013.01); *B60D 1/07* (2013.01); *B60D 2001/005* (2013.01)

(58) Field of Classification Search
CPC .... G05D 1/01; G05D 1/0287; G05D 2201/02; G05D 2201/0212; G05D 2201/0214;
(Continued)

(56) References Cited

U.S. PATENT DOCUMENTS 7,836,829 B2    11/2010 Burger
8,761,987 B2 *  6/2014 Olinger ............... G05D 1/0261
                                              324/207.22
(Continued)

FOREIGN PATENT DOCUMENTS

CA    3126830 A1 *   8/2020   ............. A63G 25/00
CN    201161108       12/2008
(Continued)

OTHER PUBLICATIONS

R. K. Jurgen, "Technology 1992-transportation," in IEEE Spectrum, vol. 29, No. 1, pp. 55-57, Jan. 1992, doi: 10.1109/6.109608. (Year: 1992).*

(Continued)

*Primary Examiner* — Cuong H Nguyen
(74) *Attorney, Agent, or Firm* — Fletcher Yoder, PC

(57) ABSTRACT

A ride system includes a first ride vehicle having a first magnet exposed along a first exterior side of the first ride vehicle and a first additional magnet exposed along a first additional exterior side of the first ride vehicle. The ride system includes a second ride vehicle having a second magnet exposed along a second exterior side of the second ride vehicle and a second additional magnet exposed along a second additional exterior side of the second ride vehicle. The ride system includes a control system configured to control maneuvering of one or both of the first and second ride vehicles to: establish a coupling between the first magnet and the second magnet in a first configuration, establish a coupling between the first magnet and the second additional magnet in a second configuration, establish a coupling between the first additional magnet and the second magnet in a third configuration, establish a coupling between the first additional magnet and the second additional magnet in a fourth configuration.

24 Claims, 13 Drawing Sheets

(51) Int. Cl.
*A63G 31/00* (2006.01)
*B60D 1/00* (2006.01)
*B60D 1/07* (2006.01)
*A63G 25/00* (2006.01)

(58) Field of Classification Search
CPC .......... G08G 1/00; A63G 31/00; A63G 25/00; B60D 2001/005; B60D 1/01; B60D 1/07
USPC ...................... 701/23; 472/59, 134
See application file for complete search history.

(56) References Cited

U.S. PATENT DOCUMENTS

| | | | | |
|---|---|---|---|---|
| 11,110,593 | B2 * | 9/2021 | Tarbaieva | ............ B65G 1/0464 |
| 2011/0061558 | A1 | 3/2011 | Crawford et al. | |
| 2016/0045833 | A1 * | 2/2016 | Boyle | .................... A63G 31/02 700/275 |
| 2019/0202048 | A1 * | 7/2019 | Tarbaieva | ................ B25J 5/007 |
| 2019/0271988 | A1 * | 9/2019 | High | .................... G05D 1/0293 |
| 2020/0294401 | A1 * | 9/2020 | Kerecsen | ............ G05D 1/0287 |

FOREIGN PATENT DOCUMENTS

| | | | | |
|---|---|---|---|---|
| CN | 104228987 | | 12/2014 | |
| CN | 106608309 | | 5/2017 | |
| CN | 108725628 | A | 11/2018 | |
| CN | 109716368 | A * | 5/2019 | ........... G05D 1/0088 |
| CN | 113382788 | A * | 9/2021 | ............. A63G 25/00 |
| DE | 102012213583 | A1 * | 2/2013 | ............ B23P 21/008 |
| JP | 2019075947 | A * | 5/2019 | .............. Y02P 80/10 |
| JP | 2022519207 | A * | 3/2022 | ............. A63G 31/02 |
| WO | WO-2019168710 | A1 * | 9/2019 | ........... G05D 1/0214 |
| WO | WO-2020163106 | A1 * | 8/2020 | ............. A63G 25/00 |

OTHER PUBLICATIONS

Z. Li, L. Zheng, W. Gao and Z. Zhan, "Electromechanical Coupling Mechanism and Control Strategy for In-Wheel-Motor-Driven Electric Vehicles," in IEEE Transactions on Industrial Electronics, vol. 66, No. 6, pp. 4524-4533, Jun. 2019, doi: 10.1109/TIE.2018.2863204.*

X. Sun et al., "Driving-Cycle-Oriented Design Optimization of a Permanent Magnet Hub Motor Drive System for a Four-Wheel-Drive Electric Vehicle," in IEEE Transactions on Transportation Electrification, vol. 6, No. 3, pp. 1115-1125, Sep. 2020, doi: 10.1109/TTE.2020.3009396 (Year: 2020).*

M. Simpson and A. P. R. Taylor, "Analysis of a Vehicle Propulsion System Using Continuous Track LIMs on Steel Plates," TENCON 2021-2021 IEEE Region 10 Conference (TENCON), Auckland, New Zealand, 2021, pp. 111-116, doi: 10.1109/TENCON54134.2021.9707414. (Year: 2021).*

PCT/US2020/015249 International Search Report and Written Opinion dated Apr. 17, 2020.

SG Office Action for Singapore Application No. 11202107401W dated Dec. 30, 2022.

* cited by examiner

RIDE SYSTEM WITH DYNAMIC RIDE VEHICLE CONFIGURATIONS

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Theme park or amusement park ride attractions have become increasingly popular. Amusement park rides often include traveling rides, which include ride vehicles that travel along a path, fixed rides, which may include a motion base, or combinations thereof. The path of a traveling ride may be situated in different surroundings (e.g., on a mountain top, in a tunnel, under water). Along the path, there may be different types of show events, such as moving action figures (e.g., animatronics), video screen projections, sound effects, water effects, and so forth.

In certain traditional ride attractions, user experiences may be affected by limitations on adjustability of a rider perspective or experience. For example, in certain traditional embodiments, the ride experience may be the same or substantially similar during each ride. Further, in certain traditional embodiments, an impact of certain ride features, such as show elements situated on or around the track, may be limited by a substantially stagnant perspective or orientation of the rider. Thus, it is now recognized that improved ride systems and ride vehicles thereof are desired.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one aspect of the present disclosure, a ride system includes a first ride vehicle having a first magnet exposed along a first exterior side of the first ride vehicle and a first additional magnet exposed along a first additional exterior side of the first ride vehicle. The ride system includes a second ride vehicle having a second magnet exposed along a second exterior side of the second ride vehicle and a second additional magnet exposed along a second additional exterior side of the second ride vehicle. The ride system includes a control system configured to control maneuvering of one or both of the first and second ride vehicles to: establish a coupling between the first magnet and the second magnet in a first configuration, establish a coupling between the first magnet and the second additional magnet in a second configuration, establish a coupling between the first additional magnet and the second magnet in a third configuration, establish a coupling between the first additional magnet and the second additional magnet in a fourth configuration.

In accordance with another aspect of the present disclosure, a ride system includes a substantially smooth ride path surface. The ride system also includes a first automated guide vehicle (AGV) having a first magnet and having first wheel set configured to enable movement of the first AGV along the substantially smooth ride path surface. The ride system also includes a second AGV having a second magnet and having a second wheel set configured to enable movement of the second AGV along the substantially smooth ride path surface. The ride system also includes a third AGV having a third magnet and having a third wheel set configured to enable movement of the third AGV along the substantially smooth ride path surface. The ride system includes a control system configured to maneuver the first AGV, the second AGV, the third AGV, or any combination thereof to enable a coupling between the first magnet and the second magnet in a first configuration, between the first magnet and the third magnet in a second configuration, and between the second magnet and the third magnet in a third configuration.

In accordance with another aspect of the present disclosure, a ride system includes a first ride vehicle having first magnet extending from first exterior sides of the first ride vehicle, a second ride vehicle having second magnets extending from second exterior sides of the second ride vehicle, and a control system. The control system is configured to maneuver the first ride vehicle, the second ride vehicle, or both to enable dynamic coupling and decoupling of certain of the first magnets with certain of the second magnets along a ride path of the ride system such that a ride vehicle configuration changes during the course of the ride path, where the ride vehicle configuration includes at least one of a vehicle order of travel relative to an end of the ride path, a vehicle direction of travel, or a vehicle orientation relative to the vehicle direction of travel.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
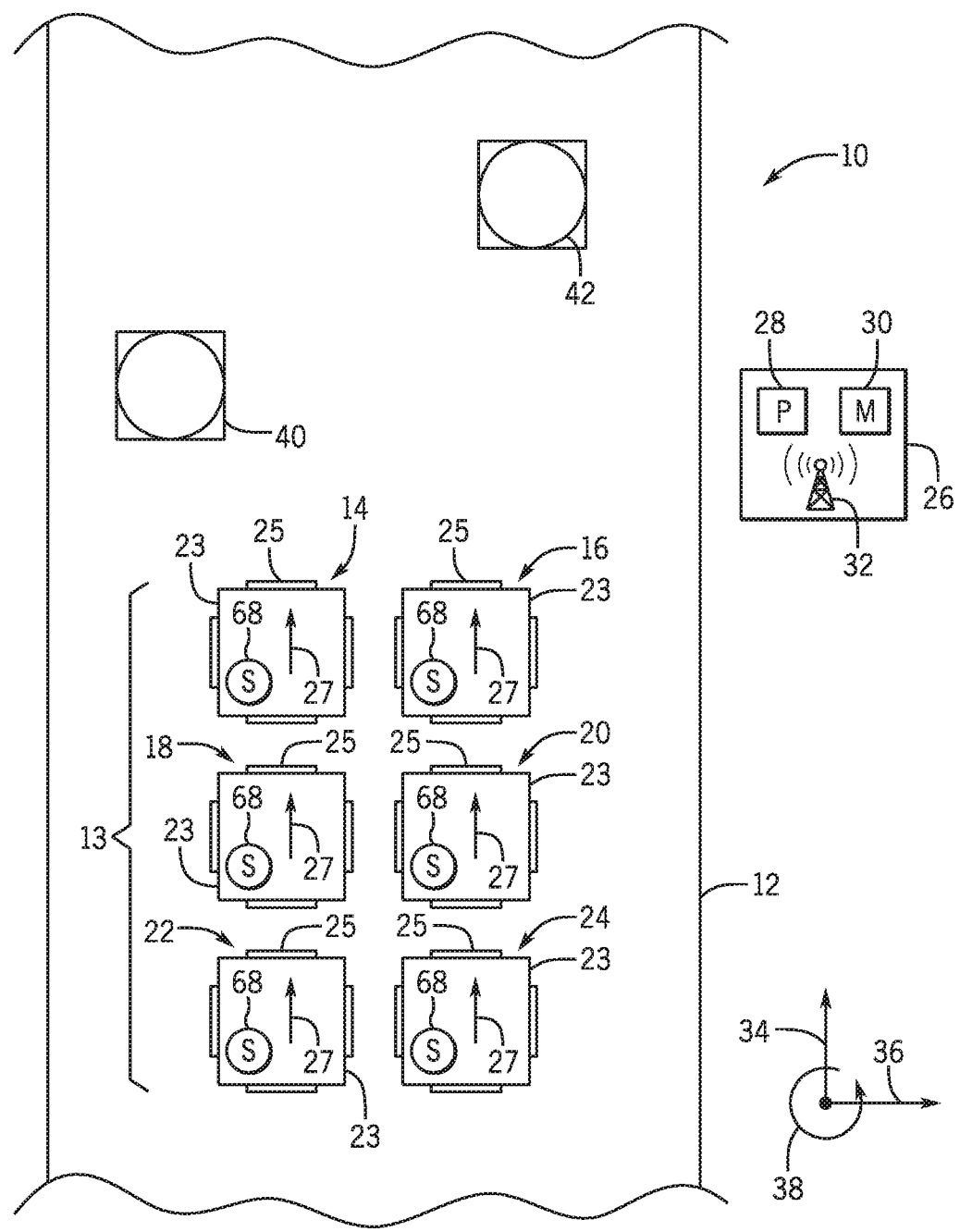
FIG. 1 is a schematic illustration of a ride system having a plurality of ride vehicles, such as automated guide vehicles (AGVs), and a control system for controlling the plurality of ride vehicles, in accordance with an aspect of the present disclosure.

Presently disclosed embodiments are directed toward ride vehicles having dynamic ride vehicle configurations. More particularly, present embodiments are directed toward modular ride vehicles which can be controlled to form various sized ride vehicle clusters throughout a ride path of a ride system, to change orientations of the ride vehicles throughout the ride path relative to a direction of travel, to change an order of ride vehicles traveling along the ride path relative to a beginning or end of the ride path, and to interact with various show elements disposed along the ride path, among other reconfigurations.

Theme park or amusement park ride attractions have become increasingly popular. Amusement park rides often include traveling rides, which include ride vehicles that travel along a path, fixed rides, which may include a motion base, or combinations thereof. The path of a traveling ride may be situated in different surroundings (e.g., on a mountain top, in a tunnel, under water). Along the path, there may be different types of show events, such as moving action figures (e.g., animatronics), video screen projections, sound effects, water effects, and so forth.

In certain traditional ride attractions, user experiences may be affected by limitations on adjustability of a rider perspective or experience. For example, in certain traditional embodiments, the ride experience may be the same or substantially similar during each ride. Further, in certain traditional embodiments, an impact of certain ride features, such as show elements situated on or around the track, may be limited by a substantially stagnant perspective or orientation of the rider. Thus, it is now recognized that improved ride systems and ride vehicles thereof are desired.

In accordance with the present disclosure, a ride system may include ride vehicles, for example automated guide vehicles (AGVs), which are joinable and separable to modulate ride configurations of the ride vehicles. An AGV may be a portable or robotic vehicle that has individual freedom of motion and travels along a substantially smooth ride path, for example via the assistance of markers, magnets, sensors, or a combination thereof. The ride vehicles (e.g., AGVs) of the disclosed ride system may be modular (e.g., substantially similar) to improve interchangeability of the ride vehicles to form different ride configurations. For example, each ride vehicle may be equipped with one or more magnets. In certain embodiments, each ride vehicle may include a number of magnets disposed around a perimeter, or exterior surfaces, of the ride vehicle. The magnets may enable the ride vehicles (e.g., AGVs) to couple and to decouple with each other, and/or with show elements, to facilitate different ride configurations, such as different units or clusters of ride vehicles, different directions of travel of the ride vehicles, different orientations (i.e., roll, pitch, yaw) of the ride vehicles relative to each other and/or relative to a direction of travel, different orders of travel (e.g., relative to an end of the ride path or another stationary reference frame along the ride path) of the ride vehicles, different separation distances between ride vehicles, and others. It should be noted that, in some embodiments, the magnets may include opposing polarities, either permanently or based on control of the magnets by a controller or control system, such that certain combinations cause magnetic repulsion of adjacent ride vehicles. For example, the control system may reverse an electric current through an electromagnet to reverse the polarity, or the control system may rotate a bar magnet to change a polarity of the portion of the magnet facing outwardly from the ride vehicle.

The modularity of the ride vehicles, in addition to the modularity of various regions of an individual ride vehicle (e.g., magnets disposed in similar locations along two or more similar sides of the individual ride vehicle) may enable enhanced configurations (e.g., improved amounts of configurations and improved types or categories of configurations) of the ride system compared to traditional embodiments. By enabling the enhanced configurations, a rider experience is improved over the course of a ride, and the rider experience may be different from one ride to the next. These and other features will be described in detail below with reference to the drawings.

FIG. 1 is a schematic illustration of an embodiment of a ride system 10 having a number of ride vehicles 13, such as automated guide vehicles (AGVs), and a control system 26 for controlling the ride vehicles 13. The ride vehicles 13 may be configured to receive passengers, such as one or two passengers per ride vehicle 13, although other embodiments may include a different number of passengers per ride vehicle 13. The ride vehicles 13 include a first ride vehicle 14, a second ride vehicle 16, a third ride vehicle 18, a fourth ride vehicle 20, a fifth ride vehicle 22, and a sixth ride vehicle 24. However, any number of ride vehicles 13 may be included in the ride system 10, such as two, three, four, five, six, seven, eight, nine, ten, or more ride vehicles 13.

The illustrated ride vehicles 13 may travel along a ride path 12, such as a substantially smooth ride path. That is, the ride path 12 may not include a track on which the ride vehicles 13 are disposed. Instead, the ride vehicles 13 may include wheel sets (not shown) which enable movement of the ride vehicles 13 along the substantially smooth ride vehicle path 12. It should be noted that "substantially smooth" may refer to the ride path 12 not include a track or structural element along which the ride vehicles 13 are guided, although the substantially smooth ride path 12 may include curves such as hills along which the ride vehicles 13 travel. Movement of the ride vehicles 13 may be controlled at least in part by the control system 26. The control system 26 may include a processor 28, a memory 30, and communications circuitry 32 which enables communication (e.g., remote or wireless communication) between the control system 26 and the ride vehicles 13. The memory 30 may include instructions stored thereon that, when executed by the processor 28, cause the processor 28 to make determinations related to the ride vehicles 13, and to communicate with the ride vehicles 13 via the communications circuitry 32.

In some embodiments, each ride vehicle 13 may include a sensor 68, such as a proximity sensor, that is capable of communicating sensor feedback to the control system 26, such that the processor 28 may make determinations relating to the ride vehicles 13 based at least in part on the sensor feedback. For example, the sensors 68 may detect a proximity of the ride vehicles 13 to adjacent ride vehicles 13 and/or to other features of the ride system 10, such as show elements 40, 42. Further, the control system 26 may include a remote controller or remote control system as shown, and/or individual controllers installed on each of the ride vehicles 13, whereby control features on the ride vehicles 13 and control features remotely situation are capable of communicating to facilitate maneuvering of the ride vehicles 13 in accordance with the description below.

The ride vehicles 13 may also include magnets 25 disposed or exposed along exteriors of the ride vehicles 13. The magnets 25 may be electromagnets which are magnetized via an electric current controllable by, for example, the control system 26 (or an individual ride vehicle controller), or the magnets 25 may be permanent magnets. In some embodiments where the magnets 25 are electromagnets, the control system 26 may reverse an electric current within the one or more of the magnets 25 to reverse a polarity of the one or more magnets 25, which may cause magnetic repulsion. In other embodiments, a bar magnet may be rotated to change the polarity of the bar magnet facing outwardly from the ride vehicle 13. Magnetic repulsion can be utilized to magnetically decouple the magnets and/or to cause movement of one or more of the ride vehicles 13.

As shown, each ride vehicle 13 includes a rectangular shape, although shapes of the ride vehicles 13 may differ in other embodiments. More particularly, each ride vehicle 13 may include a substantially rectangular bumper shape 23 formed by bumpers of the ride vehicle 13, whereby the magnets 25 are disposed on each side of the substantially rectangular bumper shape. That is, one magnet 25 (or more) may be disposed on a front bumper, another magnet 25 (or more) may be disposed on a back bumper, another magnet 25 (or more) may be disposed on a side bumper, and another magnet 25 (or more) may be disposed on the opposing side bumper. The magnets 25 may enable coupling of the various bumpers of adjacent ride vehicles 13, which will be described in detail with reference to later drawings. Reference to "front bumper," "back bumper," and "side bumper" may be relative terms indicative of a direction a passenger within the ride vehicle 13 faces. For example, as shown, the passengers in the ride vehicles 13 may be facing forward toward the show elements 40, 42, as indicated by orientation arrows 27. Thus, in the illustrated embodiment, the bumper segment of the regular bumper shape closest to the show elements 40, 42 may be the "front bumper." It should be noted that, while the ride vehicles 13 include four magnets, one on each bumper of the rectangular bumper shape 23, in other embodiments, each side of the substantially rectangular bumper shape 23 may include two or more magnets separated from each other.

The vehicles 13 in the illustrated embodiment are separated from each other and disposed on the ride path 12. As will be appreciated in view of later drawings and corresponding description, the magnets 25 of the vehicles 13 may be selectively coupled (e.g., by the control system 26, and/or via the assistance of the sensor feedback relating to relative proximities of the ride vehicles 13, which may be received by the control system 26) and decoupled. The magnets 25 may facilitate improved coupling of traditional locking mechanisms because the magnets 25 require mere contact, whereas traditional locking mechanisms may require slowing or stopping of the ride vehicles 13 to lockingly engage.

The ride vehicles 13 may be maneuverable along the ride path 12 in (or opposing to) direction 34, and in (or opposing to) direction 36. Further, the ride vehicles 13 may be yawed in (or opposing to) circumferential direction 38. Thus, while the orientation direction 27 of each of the ride vehicles 13 is substantially similar in the illustrated embodiment, the ride vehicles 13 may be maneuvered to include different orientation directions 27 (e.g., relative to a beginning or end of the ride path 12, the show elements 40, 42 of the ride path 12, or some other substantially stationary reference point). As previously described, the control system 26 may operate to control movement of the ride vehicles 13. In certain embodiments, the ride vehicles 13 may include individual controllers (e.g., disposed on the particular ride vehicle 13) which either independently, or in conjunction with the control system 26, operates to maneuver the rid vehicle 13.

As shown, the ride vehicles 13 are modular, meaning that each ride vehicle 13 may be interchangeable with another ride vehicle 13. In other words, the first ride vehicle 14 is substantially similar to the second ride vehicle 16, the third ride vehicle 18, the fourth ride vehicle 20, the fifth ride vehicle 22, and the sixth ride vehicle 24. At least in part because the ride vehicles 13 are modular, include magnets 25 disposed along several exterior surfaces of each ride vehicle 13, and are maneuverable in (or opposing to) the directions 34, 36, 38, configurations of the ride vehicles 13 can be dynamically changed along the ride path 12. For example, as previously described, directions of travel may be changed, orientations may be changed, groupings of ride vehicles 13 may be changed, order of travel (e.g., relative to a reference point along the ride path 12, such as a beginning or end of the ride path 12) may be changed, distances between individual ride vehicles 13 or groups (e.g., "clusters") of ride vehicles 13 may be changed, interactions with the show elements 40, 42 of the ride system 10 may be initiated, etc. These and other features will be described in detail below with reference to the drawings.

Figure 2:
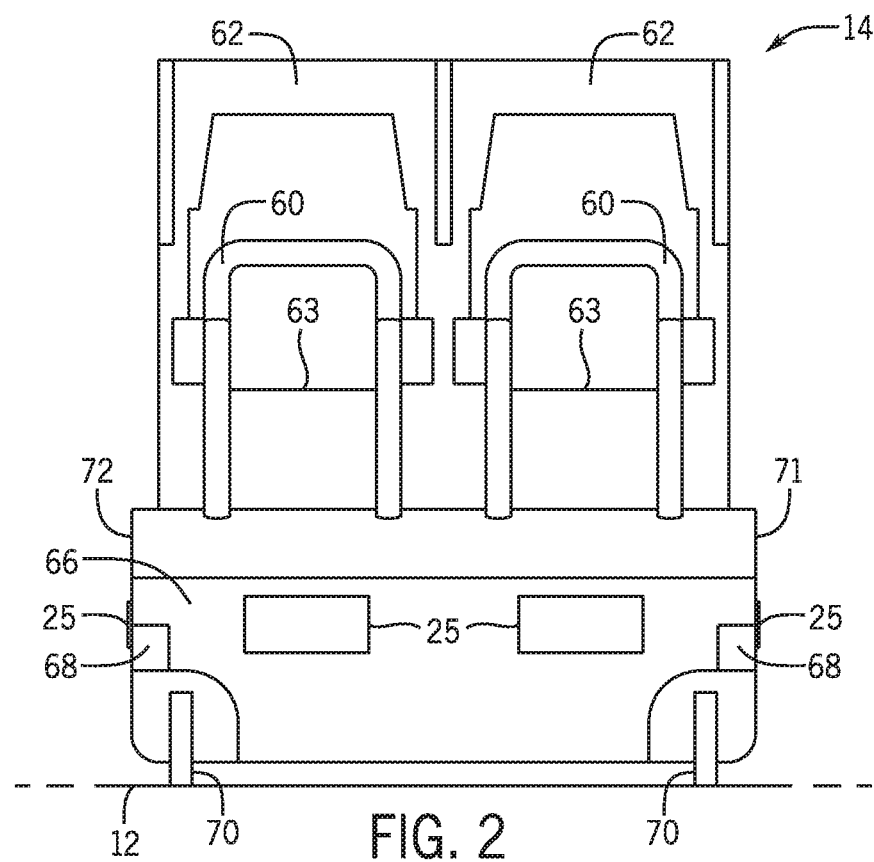
FIG. 2 is a front view of an AGV having coupling magnets, for use in the ride system of FIG. 1, in accordance with an aspect of the present disclosure.

FIG. 2 is a front view of an embodiment of the first ride vehicle 14 of FIG. 1. As previously described, the ride vehicles 13 of FIG. 1 may be modular, or include modular coupling features, meaning that the illustrated first ride vehicle 14 of FIG. 2 may be substantially similar to, or include substantially similar coupling features as, the other ride vehicles 13 of FIG. 1. This modularity enhances an amount of type of reconfigurations that are possible relative to traditional embodiments. The illustrated ride vehicle 14 will be referred to as an AGV below. The AGV 14 includes two passenger seats 63, each configured to receive a passenger. Further, the AGV 14 includes two head rests 62 corresponding to the two passenger seats 63, and two safety restraint bars 60. In the illustrated embodiment, the AGV 14 includes a first exterior side (e.g., a front bumper 66), two second exterior sides (e.g., two side bumpers 71, 72) extending from the first exterior side, and a fourth exterior side (e.g., back bumper [not shown]). The front bumper 66 includes two magnets 25, and the opposing side bumpers 71, 72 may each include two magnets 25, although only one magnet 25 along the side bumpers 71, 72 is shown due to the illustrated perspective.

The magnets 25 of the first AGV 14, as previously described, may be coupled and decoupled to other magnets of other ride vehicles along various segments of the ride path 12. The illustrated AGV 14 also includes a wheel set 70 which facilitates movement of the AGV along the ride path 12. Further, the AGV 14 includes at least one (e.g., one, two, three, four, or more) proximity sensors 68, for example disposed along the exterior of the AGV 14. The proximity sensors 68 in the illustrated embodiment are disposed adjacent edges between the front bumper 66 and the side bumpers 71, 72. The proximity sensors 68 may detect a proximity of adjacent ride vehicles, and may send proximity data to the control system 26 illustrated in FIG. 1, which may couple and decouple the first AGV 14 to adjacent AGVs based at least in part on the sensor feedback. The proximity sensors 68 may be, for example, laser proximity sensors, infrared proximity sensors, Doppler Effect proximity sensors, magnetic proximity sensors, Hall Effect proximity sensors, or some other suitable proximity sensor.

Figure 3:
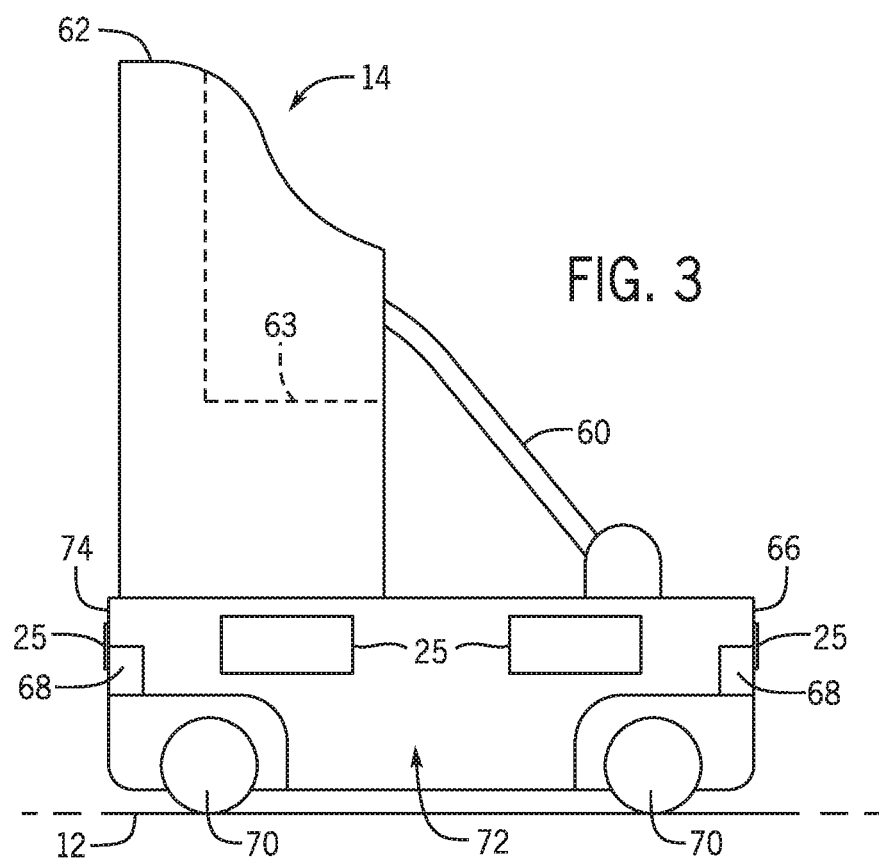
FIG. 3 is a side view of the AGV of FIG. 2, in accordance with an aspect of the present disclosure.

FIG. 3 is a side view of the AGV 14 of FIG. 2. As shown, the AGV 14 includes the front bumper 66, two side bumpers 71, 72 (only one shown due to the illustrated perspective), and a back bumper 74. As shown, the proximity sensors 68 may be disposed between edges formed between the illustrated side bumper 71, 72 and the front and back bumpers 66, 74.

Figure 4:
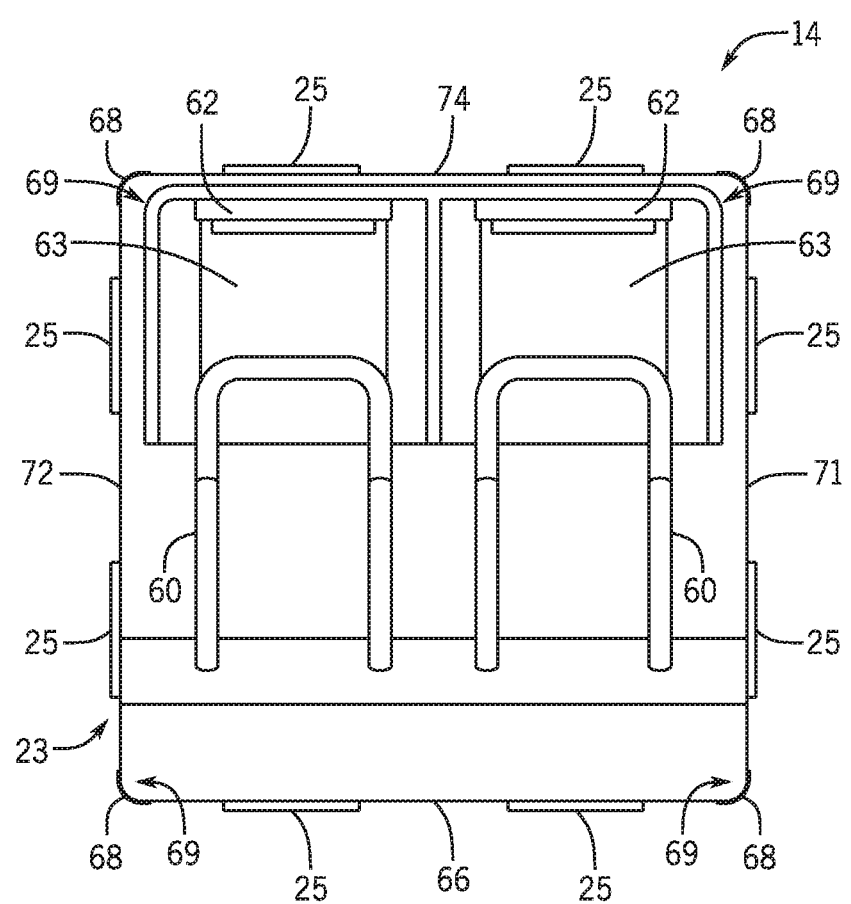
FIG. 4 is a top-down view of the AGV of FIG. 2, in accordance with an aspect of the present disclosure.

FIG. 4 is a top-down view of the AGV 14 of FIG. 2. As shown, the AGV 14 includes the substantially rectangular bumper shape 23, formed by the front bumper 66, the back bumper 74, and the two side bumpers 71, 72 (e.g., four exterior sides). The proximity sensors 68 are disposed at four corners 69 of the substantially rectangular bumper shape 23. As shown, two magnets 25 are disposed on each of the front bumper 66, the first side bumper 71, the second side bumper 72, and the back bumper 74. The magnets 25 on the front bumper 66 are spaced by a distance equal to a distance the magnets 25 are spaced on the back bumper 74, equal to a distance the magnets 25 are spaced on the first side bumper 71, and equal to a distance the magnets 25 are spaced on the second side bumper 72. Thus, any of the four bumpers 66, 71, 72, 74 of the illustrated first ride vehicle 14 may be coupled to any of the four bumpers of the other ride vehicles (e.g., the second 16, the third ride vehicle 18, the fourth ride vehicle 20, the fifth ride vehicle 22, and the sixth ride vehicle 24 of FIG. 1).

Figure 5:
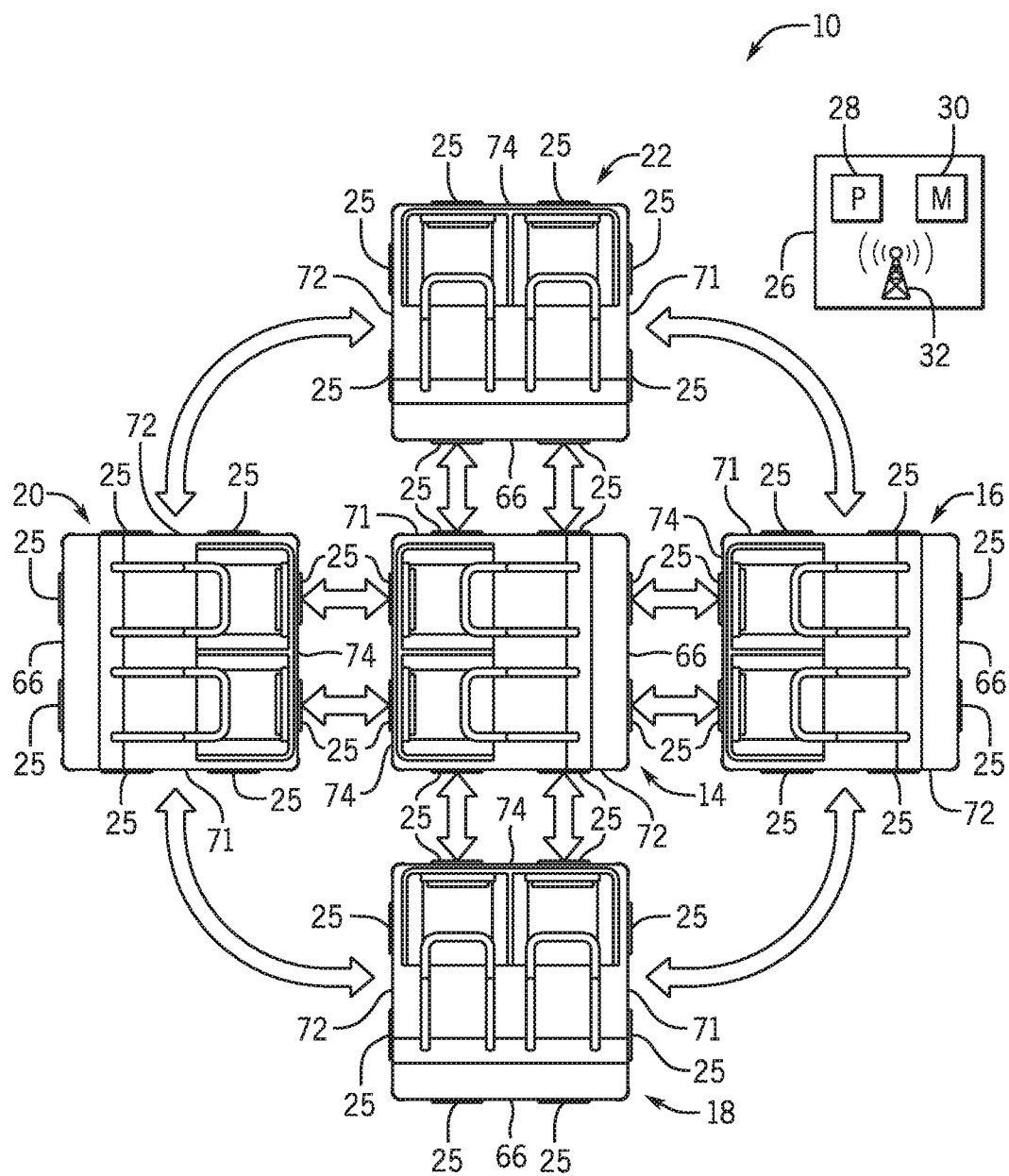
FIG. 5 is a top-down view of potential coupling maneuvers of a plurality of AGVs, for use in the ride system of FIG. 1, in accordance with an aspect of the present disclosure.

For example, FIG. 5 is a top-down view of an embodiment of potential coupling maneuvers of a plurality of AGVs, for use in the ride system 10 of FIG. 1. Five AGVs, including the first AGV 14, the second AGV 16, the third AGV 18, the fourth AGV 20, and the fifth AGV 22 are shown, although more or fewer AGVs may be included in another embodiment. As shown, the first AGV 14 is substantially surrounded by the second AGV 16, the third AGV 18, the fourth AGV 20, and the fifth AGV 22. The arrows illustrate how the front bumper 66 of the first AGV 14 can be magnetically coupled to the back bumper 74 of the second AGV 16, how the side bumper 72 of the first AGV 14 can be magnetically coupled to the back bumper 74 of the third AGV 18, how the back bumper 74 of the first AGV 14 can be magnetically coupled to the back bumper 74 of the fourth AGV 20, and how the side bumper 71 of the first AGV 14 can be magnetically coupled to the front bumper 66 of the fifth AGV 22. Likewise, the curved arrows show how the side bumper 72 of the second AGV 16 can be magnetically coupled to the side bumper 72 of the third AGV 18, how the side bumper 72 of the third AGV 18 can be magnetically coupled to the side bumper 71 of the fourth AGV 20, how the side bumper 72 of the fourth AGV 20 can be magnetically coupled to the side bumper 72 of the fifth AGV 22, and how the side bumper 71 of the fifth AGV 22 can be magnetically coupled to the side bumper 71 of the second AGV 16. Of course, the positions of the AGV 14 can also be changed, such that, for example, any one of the AGVs 14, 16, 18, 20, 22 could be disposed in the middle of the illustrated embodiment, or such that a different arrangement or cumulative shape of the coupled AGVs 14, 16, 18, 20, 22 is possible. Further still, any number of the AGVs 14, 16, 18, 20, 22 may or may not be coupled, forming differently sized vehicle clusters or groups. That is, the AGVs 14, 16, 18, 20, 22 can be magnetically coupled to form different groups, different orders, and different orientations, among other configuration changes.

FIGS. 6-11 illustrate perspective views of an embodiment of a ride sequence in which ride vehicles are magnetically coupled and decoupled to form various configurations. For simplicity, the ride vehicles are referred to as AGVs below. Further, in an effort to simplify the drawings and corresponding description, many of the numbered aspects of the illustrated AGVs, in particular the magnets, are not numbered in FIGS. 6-11.

Figure 6:
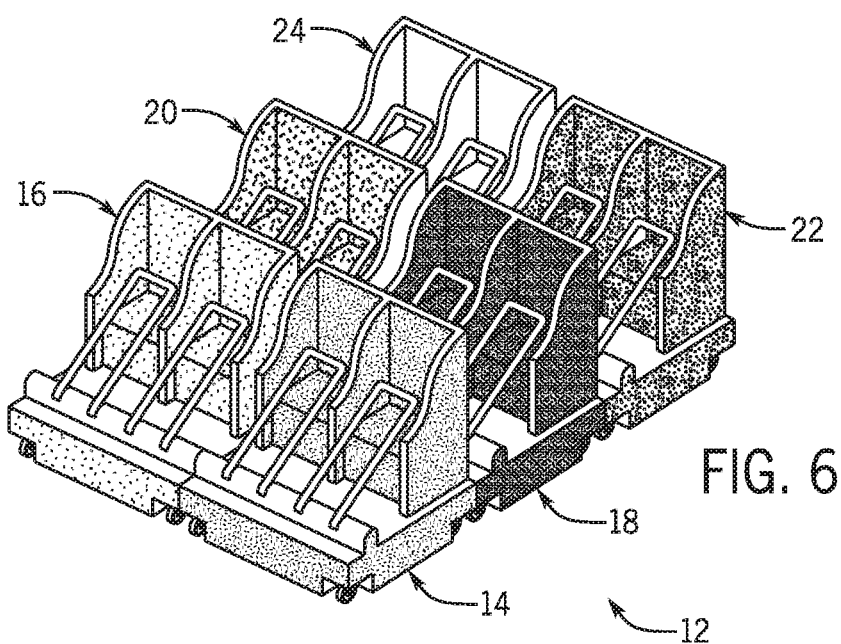
FIG. 6 is a perspective view of a plurality of AGVs of the ride system of FIG. 1 coupled in a six-vehicle cluster, in accordance with an aspect of the present disclosure.
Figure 7:
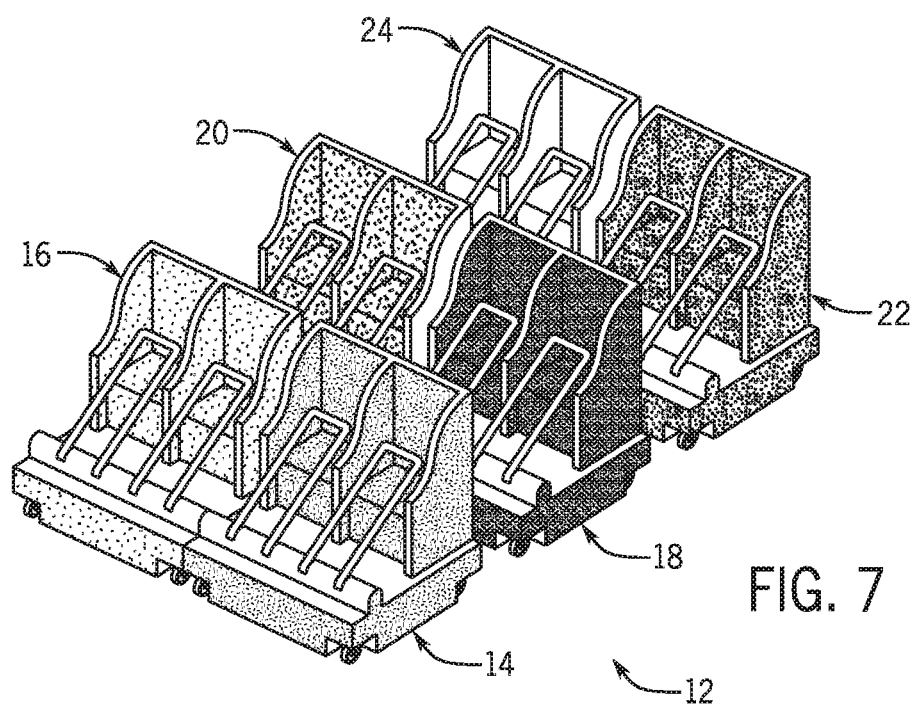
FIG. 7 is a perspective view of the plurality of AGVs of FIG. 6 whereby pairs of AGVs are coupled in two-vehicle clusters, in accordance with an aspect of the present disclosure.

In FIG. 6, the first AGV 14 is magnetically coupled to the second AGV 16 side-by-side, the third AGV 18 is magnetically coupled to the fourth AGV 20 side-by-side, and the fifth AGV 22 is magnetically coupled to the sixth AGV 24 side-by-side. Further, the sixth AGV 24 is magnetically coupled to the fourth AGV 20 front-to-back, the fifth AGV 22 is magnetically coupled to the third AGV 18 front-to-back, the fourth AGV 20 is magnetically coupled to the second AGV 15 front-to-back, and the third AGV 18 is magnetically coupled to the first AGV 14 front-to-back. Thus, the first AGV 14, the second AGV 16, the third AGV 18, the fourth AGVC 20, the fifth AGV 22, and the sixth AGV 24 form a six-vehicle cluster having three rows and two columns. In FIG. 7, the rows are magnetically decoupled from one another. For example, the first AGV 14 is magnetically decoupled from the third AGV 18, the second AGV 16 is magnetically decoupled from the fourth AGV 20, the third AGV 18 is magnetically decoupled from the fifth AGV 22, and the fourth AGV 20 is magnetically decoupled from the sixth AGV 24. That is, the AGVs are magnetically decoupled to form three two-vehicle clusters. The magnetic decoupling may involve, for example, controlling the magnets of the AGVs 14, 16, 18, 20, 24 such that the magnets do not magnetically attract each other, and in some embodiments such that the magnets repel each other. As previously described, the magnets may be electromagnets controlled by a control system (e.g., the control system 26 of FIG. 1), and a polarity of the one or more magnets may be changed by reversing an electric current through the magnets. Additionally or alternatively, bar magnets or similar magnets may be used and may be rotatable to enable an opposing polarity to face outwardly from the vehicle.

Figure 8:
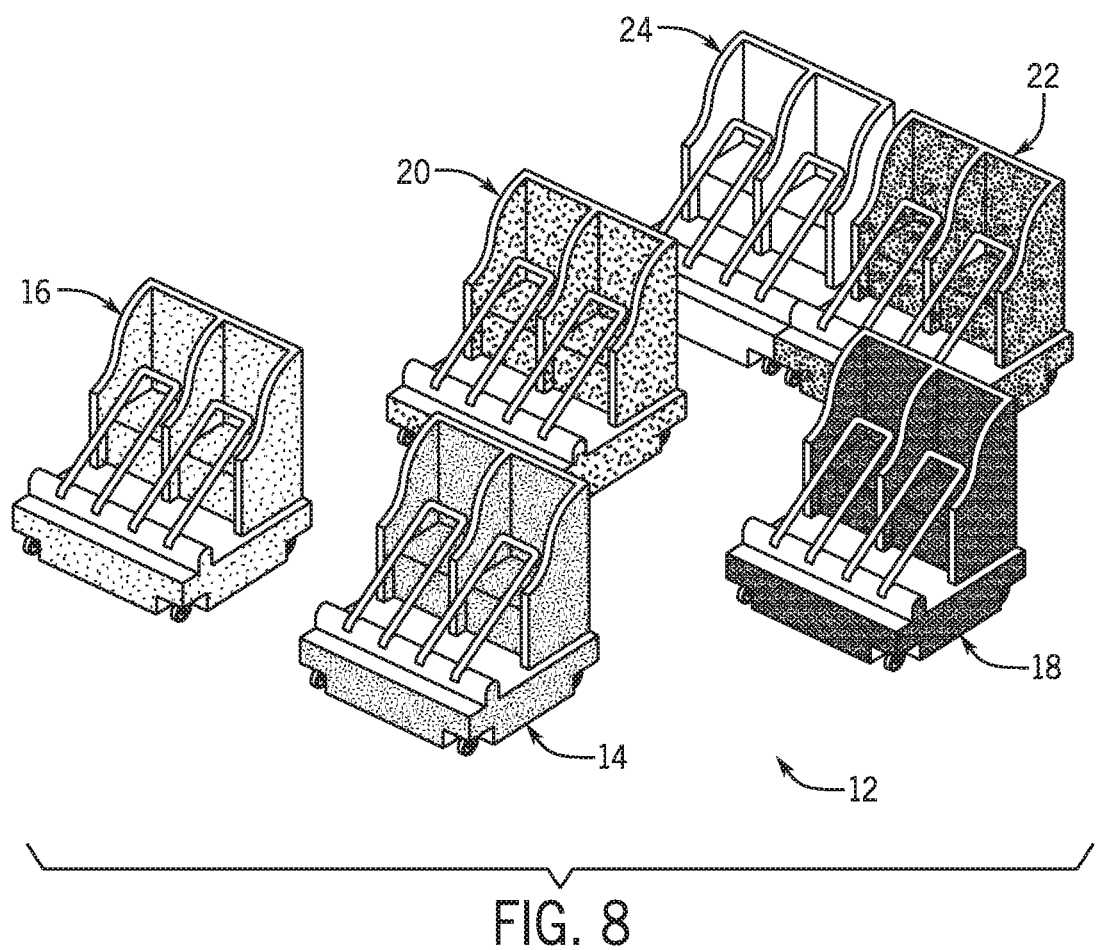
FIG. 8 is a perspective view of the plurality of AGVs of FIG. 6 whereby each AGV is fully decoupled from the other AGVs of the plurality, in accordance with an aspect of the present disclosure.

In FIG. 8, the first AGV 14 is magnetically decoupled from the second AGV 16, the third AGV 18 is magnetically decoupled from the fourth AGV 20, and the fifth AGV 22 is magnetically decoupled from the sixth AGV 24. Thus, in FIG. 8, each of the AGVs 14, 16, 18, 20, 22, 24 is maneuvered independent from magnetic coupling.

Figure 9:
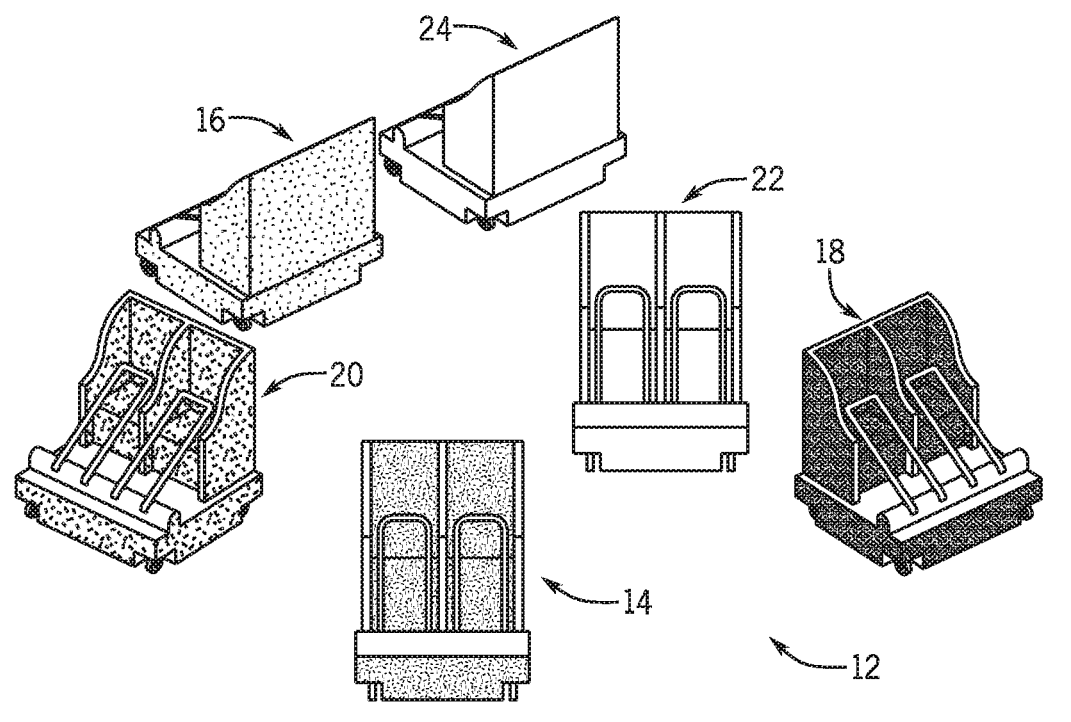
FIG. 9 is a perspective view of the plurality of AGVs of FIG. 6 whereby each AGV is maneuvered independently while decoupled from the other AGVs of the plurality, in accordance with an aspect of the present disclosure.
Figure 10:
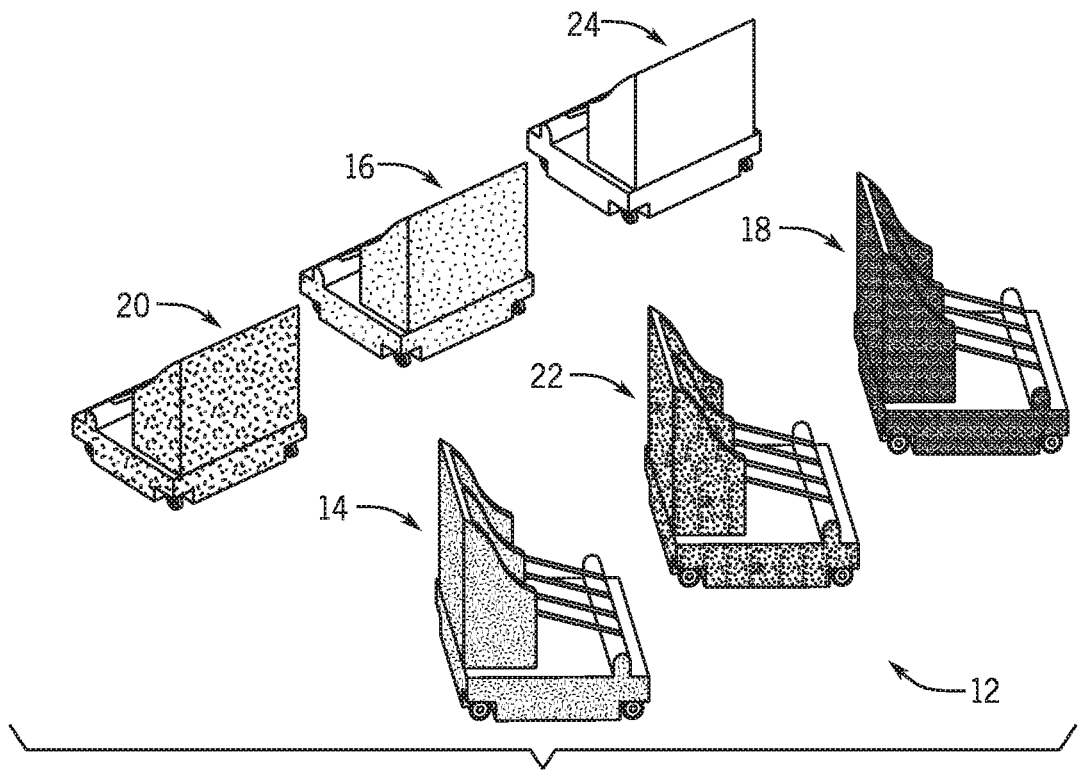
FIG. 10 is a perspective view of the plurality of AGVs of FIG. 6 whereby each AGV is maneuvered independently while decoupled from the other AGVs of the plurality, in accordance with an aspect of the present disclosure.
Figure 11:
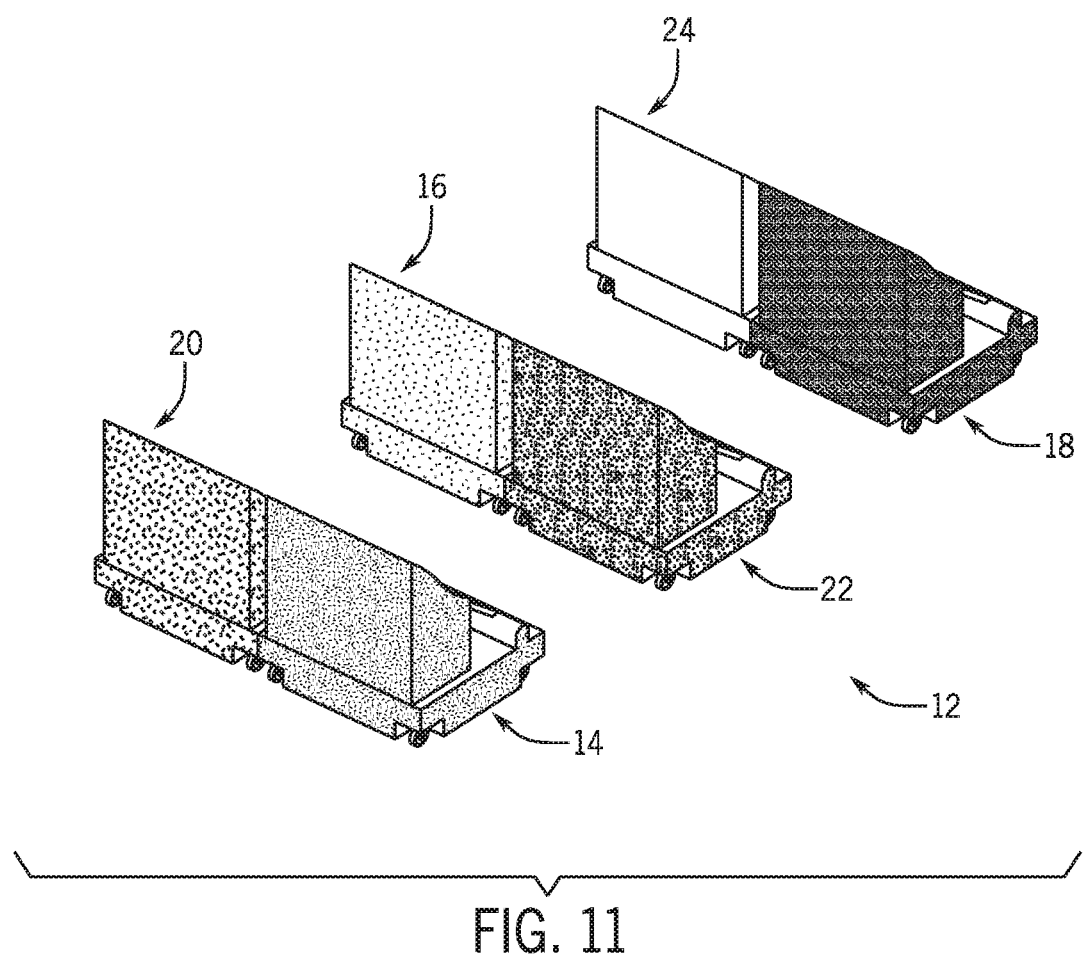
FIG. 11 is a perspective view of the plurality of AGVs of FIG. 6 whereby pairs of AGVs different from the pairs in FIG. 8 are coupled in two-vehicle clusters, in accordance with an aspect of the present disclosure.

FIGS. 9 and 10 include perspective views of the AGVs 14, 16, 18, 20, 22, 24 being maneuvered independently while decoupled from each other. The AGVs 14, 16, 18, 20, 22, 24 may be maneuvered by a control system (e.g., the control system 26 of FIG. 1). As shown, in FIG. 10, the AGVs 14, 16, 18, 20, 22, 24 may be maneuvered toward positions which enable further coupling thereof. FIG. 11 is a perspective view of the AGVs 14, 16, 18, 20, 22 magnetically coupled to form three two-vehicle clusters. That is, the first AGV 14 is magnetically coupled to the fourth AGV 20 side-by-side, the second AGV 16 is magnetically coupled to the fifth AGV 22 side-by-side, and the third AGV 18 is magnetically coupled to the sixth AGV 24 side-by-side. It should be noted that the pairings in FIG. 11 are different than those in FIG. 7. Further, the illustrated pairs may be coupled front-to-back, similar to FIG. 6, and the front-to-back pairings can also be different than the front-to-back pairings shown in FIG. 6. FIGS. 6-11 illustrate one type of ride execution possible in accordance with disclosed embodiments, although other ride executions are also possible. For example, the AGVs 14, 16, 18, 20, 22, 24 may be magnetically coupled to face different directions (e.g., to change orientations thereof), as illustrated in FIG. 5, and to form different numbers and sizes of vehicle clusters.

Figure 12:
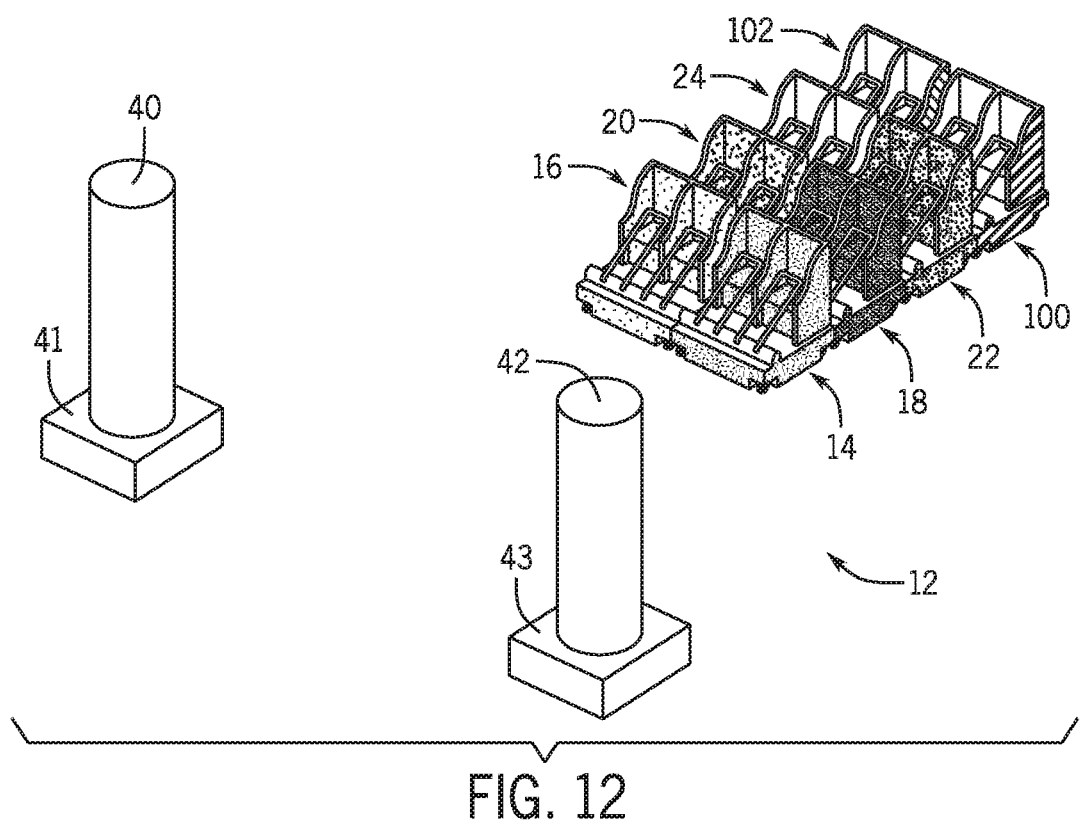
FIG. 12 is a perspective view of a plurality of AGVs of the ride system of FIG. 1 coupled in an eight-vehicle cluster, in accordance with an aspect of the present disclosure.

Another example of an embodiment of a possible ride execution of the ride system 10 of FIG. 1 is illustrated in FIGS. 12-17. FIG. 12 is a perspective view of AGVs of the ride system of FIG. 1 coupled in an eight-vehicle cluster. In an effort to simplify the drawings and corresponding description, many of the numbered aspects of the illustrated AGVs, in particular the magnets, are not numbered in FIGS. 12-17.

Figure 13:
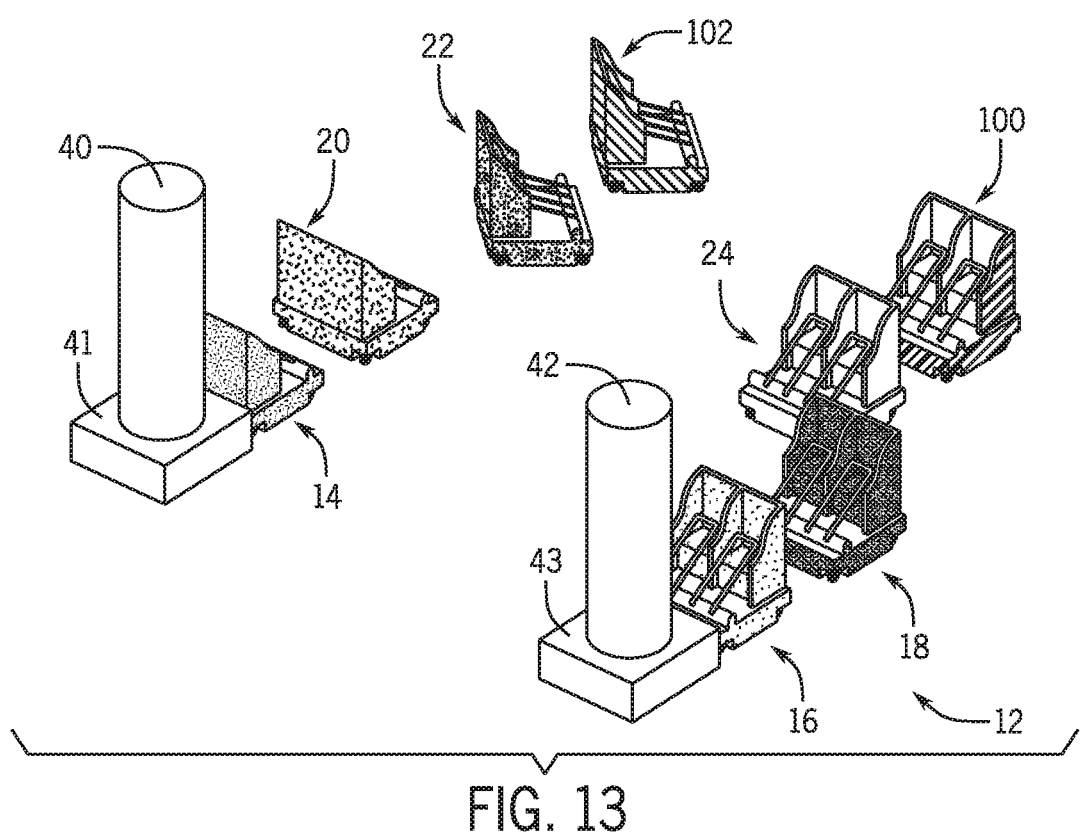
FIG. 13 is a perspective view of the plurality of AGVs of FIG. 12 following vehicle decoupling and initiating show element coupling, in accordance with an aspect of the present disclosure.
Figure 14:
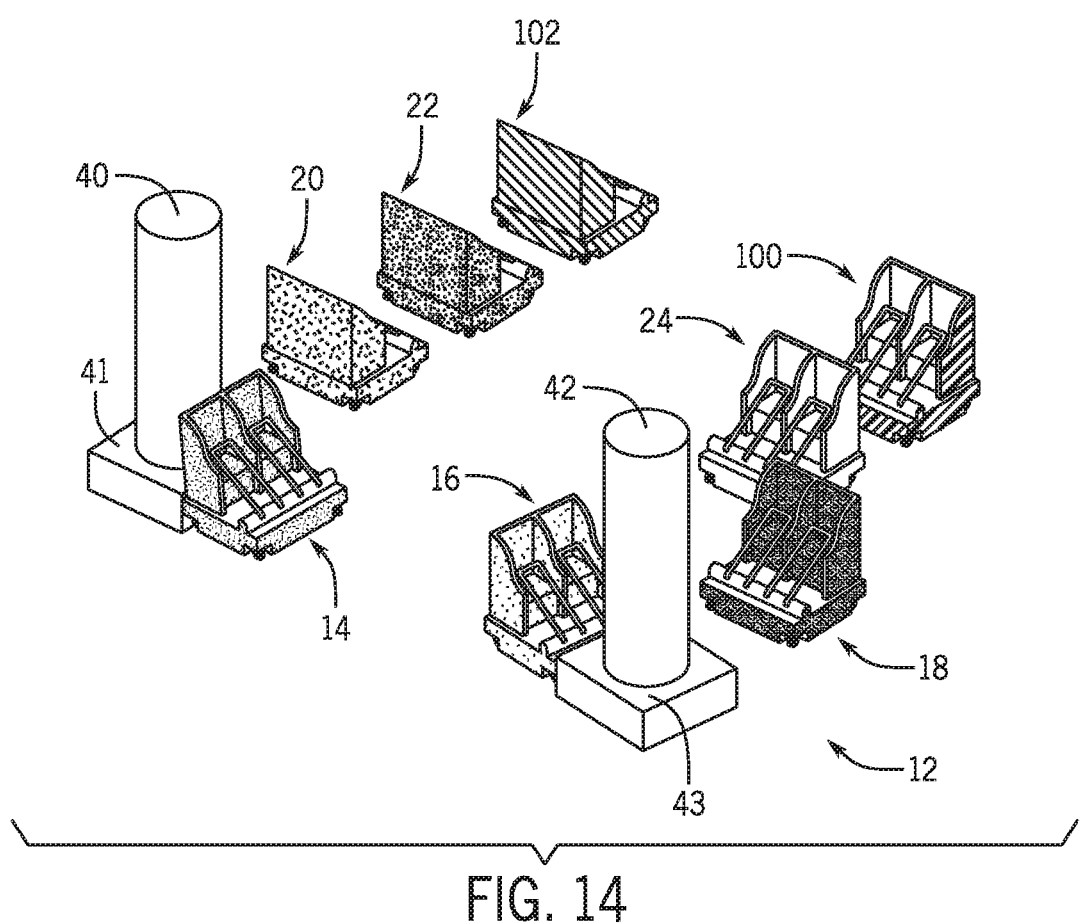
FIG. 14 is a perspective view of the plurality of AGVs of FIG. 12 coupling with show elements of the ride system, in accordance with an aspect of the present disclosure.
Figure 15:
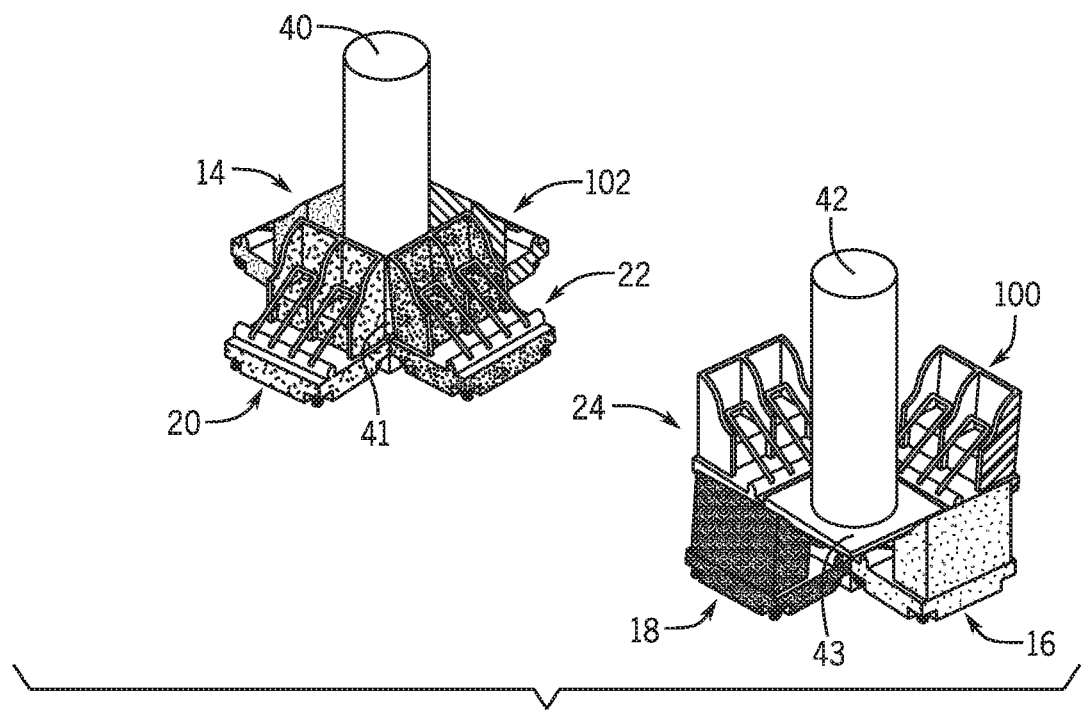
FIG. 15 is a perspective view of the plurality of AGVs of FIG. 12 coupled to show elements of the ride system, in accordance with an aspect of the present disclosure.
Figure 16:
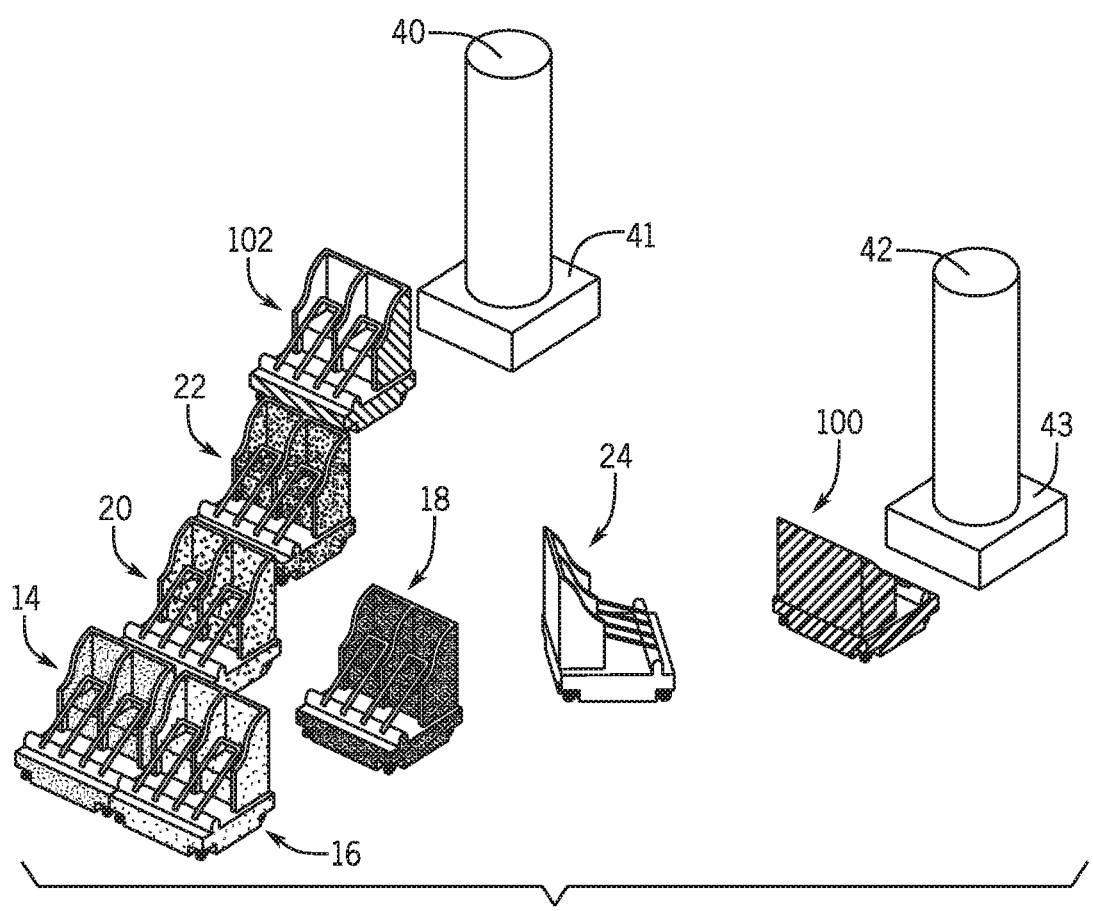
FIG. 16 is a perspective view of the plurality of AGVs of FIG. 12 decoupling from the show elements of the ride system, in accordance with an aspect of the present disclosure.
Figure 17:
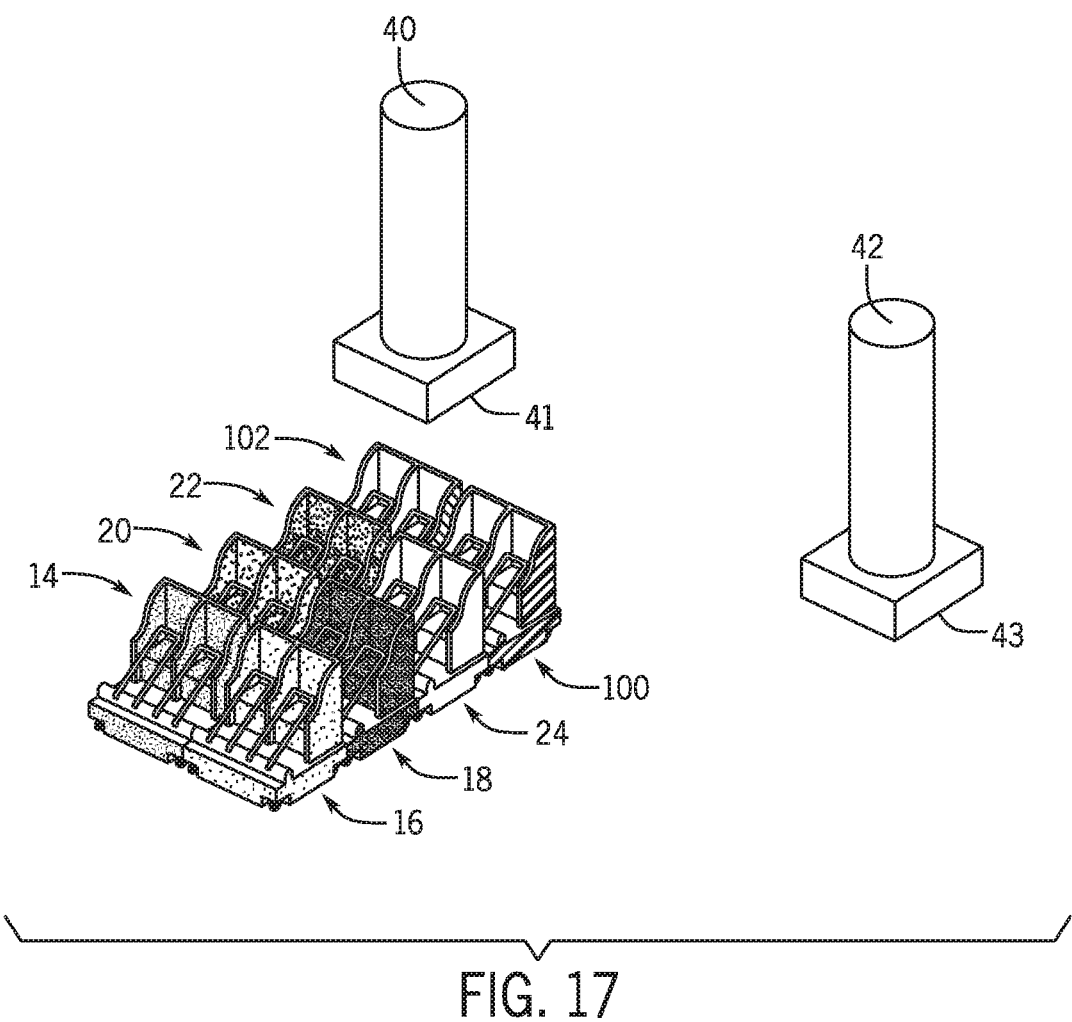
FIG. 17 is a perspective view of the plurality of AGVs of FIG. 12 coupling to form the eight-vehicle cluster, in accordance with an aspect of the present disclosure.

The illustration in FIG. 12 includes the first AGV 14, the second AGV 16, the third AGV 18, the fourth AGV 20, the fifth AGV 22, the sixth AGV 24, a seventh AGV 100, and an eighth AGV 102. The AGVs 14, 16, 18, 20, 22, 24, 100, 102 are coupled side-by-side and back-to-front to form an eight-vehicle cluster having four rows and two columns. The show elements 40, 42 are also illustrated in FIG. 12. The first show element 40 includes a first rectangular base 41 and the second show element 42 includes a second rectangular base 43. The rectangular bases 41, 43 of the show elements 40, 42, respectively, may be magnetized or otherwise capable of coupling to AGV or ride vehicle magnets. In FIGS. 13 and 14, the AGVs 14, 16, 18, 20, 22, 24, 100, 102 have been magnetically decoupled and are approaching the show elements 40, 42, and the first AGV 14 and the second AGV 16 are magnetically coupled to the rectangular bases 41, 43 of the show elements 40, 42, respectively, with the third AGV 18 and the fourth AGV 20 approaching magnetic coupling to the rectangular bases 41, 43. FIG. 15 is a perspective view of the ride system whereby all eight AGVs 14, 16, 18, 20, 22, 24, 100, 102 are magnetically coupled to the rectangular bases 41, 43 of the show elements 40, 42, respectively. As shown, the back bumpers of the first AGV 14, the back bumper of the fourth AGV 20, the back bumper of the fifth AGV 22, and the back bumper of the eighth AGV 102 are magnetically coupled to the rectangular base 41 of the first show element 40, whereas the front bumper of the second AGV 16, the front bumper of the third AGV 18, the front bumper of the sixth AGV 24, and the front bumper of the seventh AGV 100 are magnetically coupled to the rectangular base 43 of the second show element 42. Of course, different bumpers of the various AGVs 14, 16, 18, 20, 22, 24, 100, 102 may be coupled to different ones of the bases 41, 43 of the show elements 40, 42, respectively, and in different orders. Further, in certain embodiments, only certain of the AGVs 14, 16, 18, 20, 22, 24, 100, 102 may couple to the show elements 40, 42. As previously described, the modular relation between the AGVs 14, 16, 18, 20, 22, 24, 100, 102, and the module nature of the sides and corresponding magnets of a particular one of the AGVs 14, 16, 18, 20, 22, 24, 100, 102, enables a number of dynamically adjustable ride configurations relating to a direction of travel, a grouping (e.g., size and matches), an orientation, a separation distance, etc. of the ride vehicles (e.g., the AGVs 14, 16, 18, 20, 22, 24, 100, 102).

Figure 18:
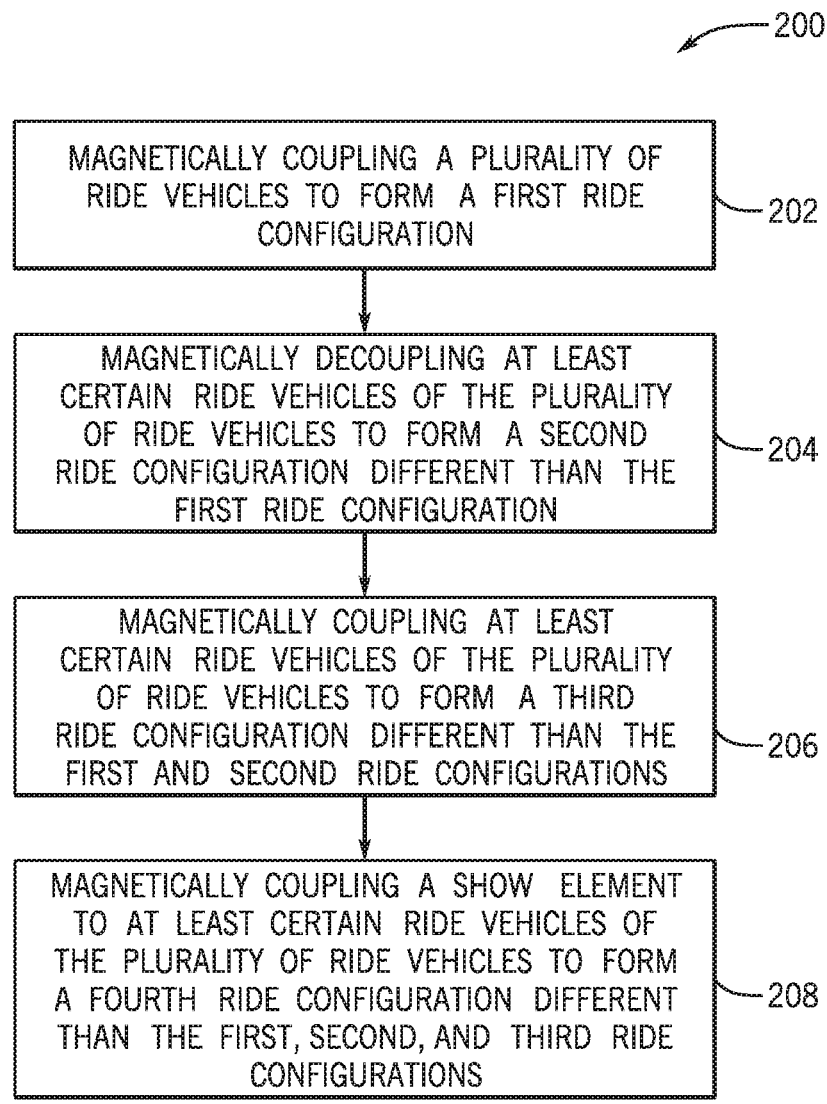
FIG. 18 is a process flow diagram illustrating a method of operating the ride system of FIG. 1, in accordance with an aspect of the present disclosure.

FIG. 18 is a process flow diagram illustrating an embodiment of a method 200 of operating the ride system of FIG. 1. In the illustrated embodiment, the method 200 includes magnetically coupling (block 202) ride vehicles to form a first ride configuration. As previously described, the ride vehicles may each include one or more magnets, for example several magnets disposed or exposed along exteriors of the ride vehicles. The ride vehicles may be coupled in various ways, such as shown above, and described with respect to, FIGS. 5-17. The ride vehicles may be magnetically coupled back-to-back, side-to-side, front-to-front, or front-to-back. The ride vehicles may be magnetically coupled in groups, or clusters, of any number of rid vehicles. The groups or clusters may travel in similar or distinct directions, and may be oriented or coupled different than each other. In some embodiments, proximity sensors may enable a control system to determine and/or facilitate appropriate couplings. For example, sensor feedback from the proximity sensors may enable the control system to determine which magnets of which ride vehicles are adjacent to each other, and to guide the magnets and corresponding ride vehicles together, into a magnetically coupled engagement. As previously described, the magnets may be coupled without an interlocking mechanism, thereby enabling the ride vehicles to magnetically couple together without having to stop or substantially slow down.

The method 200 also includes magnetically decoupling (block 204) at least certain of the ride vehicles to form a second ride configuration different than the first ride configuration. For example, as previously described, the clusters of coupled ride vehicles may be decoupled, or partially decoupled, such that ride vehicles or smaller clusters of ride vehicles can maneuver independent from the previous larger cluster. In embodiments where the magnets are electromagnets, the decoupling may be initiated by precluding an electric current therethrough, and enabling the ride vehicles to maneuver away from each other in different directions (e.g., through the assistance of a control system). Further, in certain maneuvers, the electric current may be reversed to cause the electromagnets to change polarity, which may facilitate a magnetic repulsion between two magnets of adjacent ride vehicles. The magnetic repulsion may be utilized to decouple the ride vehicles and/or to cause movement of the ride vehicles. Magnetic repulsion may also be achieved by utilizing a rotatable bar magnet which, based on a control command by a control system, rotates to cause a change of a polarity of the portion of the magnet facing outwardly from the vehicle.

The method 200 also includes magnetically coupling (block 206) at least certain other ride vehicles to form a third ride configuration different than the first ride and the second ride configuration. For example, as described above with respect to the ride sequences illustrated in FIGS. 6-11, the ride vehicles may be magnetically coupled in a first configuration relating to a vehicle order of travel, a vehicle cluster size or shape, vehicle matches, direction of travel, etc. at a first point in the ride, and may be magnetically coupled in a second configuration relating to the vehicle order of travel, the vehicle cluster size or shape, vehicle matches, direction of travel, etc. at second point in the ride, where the second configuration differs from the first configuration in at least one aspect.

The method 200 also includes magnetically coupling (block 208) a show element to at least certain ride vehicles to form a fourth ride configuration different than the first, second, and third configurations. For example, as previously described with respect to the ride sequences illustrated in FIGS. 12-17, the ride vehicles may be controlled to maneuver toward, and magnetically couple to, various show elements situated along the ride path. The ride vehicles may also be controlled to magnetically decouple from the show element and to continue along the ride path.

In accordance with the present disclosure, the present ride system includes ride vehicles controllable to enable improved configurations of the ride system and ride vehicles thereof. At least in part because the ride vehicles may be modular, may include magnets disposed along several exterior surfaces of each ride vehicle, and may be maneuverable in various directions and do not require adherence to a physical track, the ride vehicle configurations can be dynamically changed along the ride path. For example, as previously described, directions of vehicle travel may be changed, vehicle orientations may be changed, groupings of ride vehicles may be changed, vehicle order of travel (e.g., relative to a reference point along the ride path, such as a beginning or end of the ride path) may be changed, distances between individual ride vehicles or groups (e.g., "clusters) of ride vehicles may be changed, interactions with the show elements of the ride system may be initiated, etc.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A ride system, comprising:
a first ride vehicle having a first magnet extending along a first exterior side of the first ride vehicle and a first additional magnet extending along a first additional exterior side of the first ride vehicle, wherein the first additional exterior side extends transverse to the first exterior side;
a second ride vehicle having a second magnet extending along a second exterior side of the second ride vehicle and a second additional magnet extending along a second additional exterior side of the second ride vehicle, wherein the second additional exterior side extends transverse to the second exterior side; and
a control system configured to control maneuvering of one or both of the first and second ride vehicles to:
establish a first coupling between the first magnet and the second magnet in a first configuration;
establish a second coupling between the first magnet and the second additional magnet in a second configuration;
establish a third coupling between the first additional magnet and the second magnet in a third configuration; and
establish a fourth coupling between the first additional magnet and the second additional magnet in a fourth configuration.

2. The ride system of claim 1, wherein the control system is configured to control maneuvering of one or both of the first and second ride vehicles into a decoupled configuration in which there is a total decoupling of the first ride vehicle and the second ride vehicle.

3. The ride system of claim 1, wherein the first ride vehicle comprises a first passenger cabin disposed at least partially between the first exterior side and the first additional exterior side, and the second ride vehicle comprises a second passenger cabin disposed at least partially between the second exterior side and the second additional exterior side.

4. A ride system, comprising:
a first ride vehicle having a first plurality of magnets extending from first exterior sides of the first ride vehicle;
a second ride vehicle having a second plurality of magnets extending from second exterior sides of the second ride vehicle; and
a control system configured to maneuver the first ride vehicle, the second ride vehicle, or both to enable dynamic coupling and decoupling of certain first magnets of the first plurality of magnets with certain second magnets of the second plurality of magnets along a ride path of the ride system such that a ride vehicle configuration changes during the course of the ride path, wherein the ride vehicle configuration includes at least one of a vehicle order of travel relative to an end of the ride path, a vehicle direction of travel, or a vehicle orientation relative to the vehicle direction of travel.

5. The ride system of claim 1, wherein the control system is configured to control the maneuvering of one or both of the first and second ride vehicles to:
establish the first coupling between the first magnet and the second magnet in the first configuration such that the second ride vehicle faces in a first direction; and
establish the second coupling between the first magnet and the second additional magnet in the second configuration such that the second ride vehicle faces in a second direction different than the first direction.

6. The ride system of claim 1, wherein:
the first ride vehicle comprises a first exterior front side extending transverse to the first exterior side and parallel to the first additional exterior side, and a first front side magnet extending along the first exterior front side;
the second ride vehicle comprises a second exterior front side extending transverse to the second exterior side and parallel to the second additional exterior side, and a second front side magnet extending along the second exterior front side; and
the control system is configured to control maneuvering of one or both of the first and second ride vehicles to:
establish a fifth coupling between the first front side magnet and the second front side magnet in a fifth configuration;
establish a sixth coupling between the first front side magnet and the second magnet in a sixth configuration;
establish a seventh coupling between the first front side magnet and the second additional magnet in a seventh configuration;

establish an eighth coupling between the second front side magnet and the first magnet in an eighth configuration; and establish a ninth coupling between the second front side magnet and the first additional magnet in a ninth configuration.

7. The ride system of claim 1, wherein the first exterior side extends substantially perpendicular to the first additional exterior side, and the second exterior side extends substantially perpendicular to the second additional exterior side.

8. The ride system of claim 1, comprising a third ride vehicle having a third magnet extending along a third exterior side of the third ride vehicle and a third additional magnet extending along a third additional exterior side of the third ride vehicle, wherein the third additional exterior side extends transverse to the third exterior side, and wherein the control system is configured to maneuver the first, second, and/or third ride vehicles to:

establish a fifth coupling between the first magnet and the third magnet in a fifth configuration;

establish a sixth coupling between the first magnet and the third additional magnet in a sixth configuration;

establish a seventh coupling between the first additional magnet and the third magnet in a seventh configuration;

establish an eighth coupling between the first additional magnet and the third additional magnet in an eighth configuration;

establish a ninth coupling between the second magnet and the third magnet in a ninth configuration;

establish a tenth coupling between the second magnet and the third additional magnet in a tenth configuration;

establish an eleventh coupling between the second additional magnet and the third magnet in an eleventh configuration;

establish a twelfth coupling between the second additional magnet and the third additional magnet in a twelfth configuration; and totally decouple the first ride vehicle, the second ride vehicle, and the third ride vehicle in a decoupled configuration.

9. The ride system of claim 8, wherein the control system is configured to establish a magnetic coupling of the second ride vehicle to both the first ride vehicle and the third ride vehicle such that the first ride vehicle, the second ride vehicle, and the third ride vehicle form a three-vehicle cluster.

10. The ride system of claim 1, wherein:

the first ride vehicle comprises a first proximity sensor and the second ride vehicle comprises a second proximity sensor;

the control system is configured to receive sensor feedback from the first proximity sensor and the second proximity sensor; and the control system is configured to determine and cause, based at least in part on the sensor feedback, an appropriate coupling between the first magnet and the second magnet or the first magnet and the second additional magnet.

11. The ride system of claim 1, comprising an interactive show element, wherein the control system enables an additional coupling of the interactive show element with the first magnet, the first additional magnet, the second magnet, the second additional magnet, or any combination thereof.

12. The ride system of claim 1, wherein the first ride vehicle comprises a first automated guide vehicle (AGV) and the second ride vehicle comprises a second AGV.

13. The ride system of claim 12, comprising a substantially smooth ride path surface, wherein the first AGV comprises a first wheel set configured to enable movement of the first AGV along the substantially smooth ride path surface, and wherein the second AGV comprises a second wheel set configured to enable movement of the second AGV along the substantially smooth path surface.

14. The ride system of claim 1, wherein the first magnet comprises a first electromagnet, the second magnet comprises a second electromagnet, and operation of each of the first and second electromagnets is controlled by the control system.

15. A ride system, comprising:

a substantially smooth ride path surface;

a first automated guide vehicle (AGV) having a first magnet and having a first wheel set configured to enable movement of the first AGV along the substantially smooth ride path surface;

a second AGV having a second magnet and having a second wheel set configured to enable movement of the second AGV along the substantially smooth ride path surface;

a third AGV having a third magnet and having a third wheel set configured to enable movement of the third AGV along the substantially smooth ride path surface; and a control system configured to maneuver the first AGV, the second AGV, the third AGV, or a combination thereof to enable a coupling between the first magnet and the second magnet in a first configuration, between the first magnet and the third magnet in a second configuration, and between the second magnet and the third magnet in a third configuration.

16. The ride system of claim 15, wherein the first AGV comprises a first additional magnet extending along a different side of the first AGV than the first magnet, wherein the second AGV comprises a second additional magnet extending along a different side of the second AGV than the second magnet, and wherein the third AGV comprises a third additional magnet extending along a different side of the third AGV than the third magnet.

17. This ride system of claim 15, wherein the control system is configured to enable a plurality of magnetic couplings between the first AGV, the second AGV, and the third AGV such that a vehicle order of the first AGV, the second AGV, and the third AGV, relative to an end of the substantially smooth ride path surface, changes at different segments of the substantially smooth ride path.

18. The ride system of claim 15, wherein:

the first AGV comprises a first side along which the first magnet extends, a first additional side extending transverse to the first side, and a first additional magnet extending along the first additional side;

the second AGV comprises a second side along which the second magnet extends, a second additional side extending transverse to the second side, and a second additional magnet extending along the second additional side;

the third AGV comprises a third side along which the third magnet extends, a third additional side extending transverse to the third side, and a third additional magnet extending along the third additional side; and the control system is configured to maneuver the first AGV, the second AGV, the third AGV, or the combination thereof to enable an additional coupling between the first magnet and the second additional magnet in a fourth configuration, the first magnet and the third additional magnet in a fifth configuration, the second magnet and the first additional magnet in a sixth configuration, the second magnet and the third additional magnet in a seventh configuration, the third magnet and the first additional magnet in an eighth configuration, the third magnet and the second additional magnet in a ninth configuration, the first additional magnet and the second additional magnet in a tenth configuration, the first additional magnet and the third additional magnet in an eleventh configuration, and the second additional magnet and the third additional magnet in a twelfth configuration.

19. The ride system of claim 15, comprising a first proximity sensor disposed on the first AGV, a second proximity sensor disposed on the second AGV, and a third proximity sensor disposed on the third AGV, wherein the control system is configured to receive sensor feedback from the first proximity sensor, the second proximity sensor, and the third proximity sensor, and wherein the control system is configured to determine and cause, based at least in part on the sensor feedback, appropriate magnetic couplings between the first AGV, the second AGV, and/or the third AGV.

20. The ride system of claim 4, wherein:
the first plurality of magnets are distributed across a first side of the first ride vehicle and a first additional side of the first ride vehicle, the first additional side extending transverse to the first side; and
the second plurality of magnets are distributed across a second side of the second ride vehicle and a second additional side of the second ride vehicle, the second additional side extending transverse to the second side.

21. The ride system of claim 4, wherein the ride vehicle configuration comprises at least two of the vehicle order of travel relative to the end of the ride path, the vehicle direction of travel, or the vehicle orientation relative to the direction of travel.

22. The ride system of claim 4, comprising a third ride vehicle having a third plurality of magnets extending from third exterior sides of the third ride vehicle, wherein the control system is configured to maneuver the first ride vehicle, the second ride vehicle, the third ride vehicle, or a combination thereof to enable dynamic magnetic coupling and decoupling of the first ride vehicle, the second ride vehicle, and the third ride vehicle along the ride path of the ride system such that the ride vehicle configuration changes during the course of the ride path.

23. The ride system of claim 4, comprising:
a first proximity sensor disposed on the first ride vehicle; and
a second proximity sensor disposed on the second ride vehicle, wherein the control system is configured to receive sensor feedback from the first proximity sensor and the second proximity sensor, and wherein the control system is configured to dynamically couple and decouple at least a portion of the first plurality of magnets and the second plurality of magnets based at least in part on the sensor feedback.

24. The ride system of claim 4, wherein the ride path comprises a substantially smooth ride path, wherein the first ride vehicle comprises a first automated ride vehicle (AGV) having a first wheel set configured to enable movement of the first AGV along the substantially smooth ride path, and wherein the second ride vehicle comprises a second AGV having a second wheel set configured to enable movement of the second AGV along the substantially smooth ride path.

* * * * *